United States Patent [19]

Fujimoto et al.

[11] Patent Number: 4,992,712

[45] Date of Patent: Feb. 12, 1991

[54] CONTROL DEVICE FOR INDUSTRIAL MACHINE

[75] Inventors: Akihiko Fujimoto; Toshio Yamada, both of Aichi, Japan

[73] Assignee: Mitsubishi Denki Kabushiki Kaisha, Tokyo, Japan

[21] Appl. No.: 408,002

[22] Filed: Sep. 15, 1989

[30] Foreign Application Priority Data

Sep. 7, 1988 [JP] Japan ................. 63-222460
Sep. 16, 1988 [JP] Japan ................. 63-229897
Dec. 5, 1988 [JP] Japan ................. 63-306094

[51] Int. Cl.$^5$ ............................ G05B 19/18
[52] U.S. Cl. ..................... 318/569; 318/573; 318/571; 364/474.15
[58] Field of Search ............ 318/569, 573, 571; 364/474.15

[56] References Cited

U.S. PATENT DOCUMENTS

| | | | |
|---|---|---|---|
| 4,079,235 | 3/1978 | Froyd et al. | 318/573 X |
| 4,353,018 | 10/1982 | Kohzai et al. | 318/571 |
| 4,879,660 | 11/1989 | Asakura et al. | 318/571 X |

Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

A control device for an industrial machine comprising a numerical control device and a programmable controller, the numerical control device comprising: a data processing section essentially comprising a memory and a central processing unit, for analyzing and operating input numerical data, outputs of the data processing section being used for performing numerical control of a machine to be controlled and of rotation of a spindle of the machine; a gear ratio data memory for storing gear ratio data of gears through which a spindle motor is coupled to a spindle head holding a tool, the gear ratio data being applied to the gear ratio data memory through a bus from the programmable controller adapted to perform sequence control of the machine; and synchronous operation controller for calculating actual speed of rotation of the tool through operation using the gear ratio data and a feedback signal of the spindle motor, and performing synchronous operation control of the tool and a feed shaft.

4 Claims, 13 Drawing Sheets

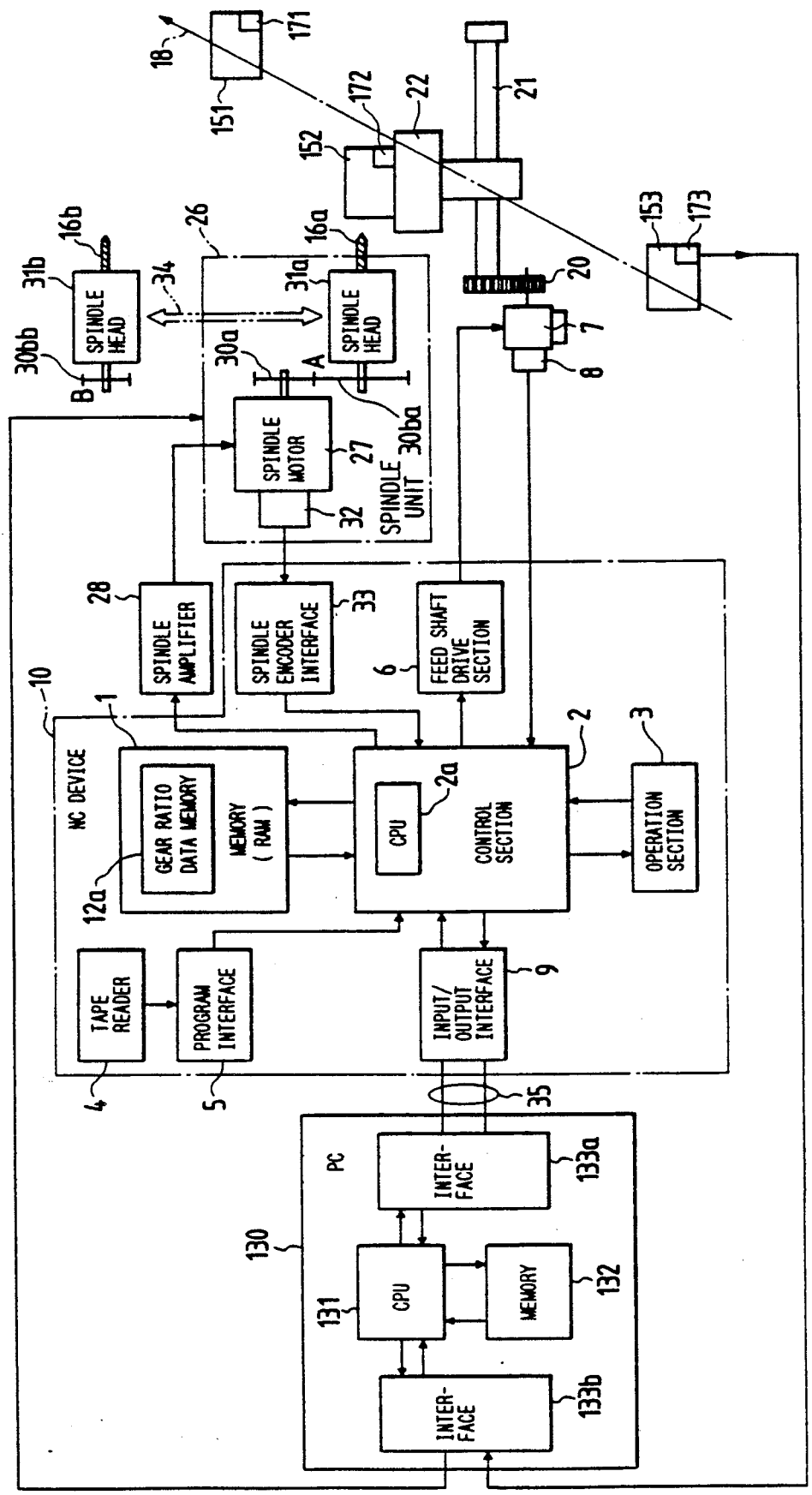

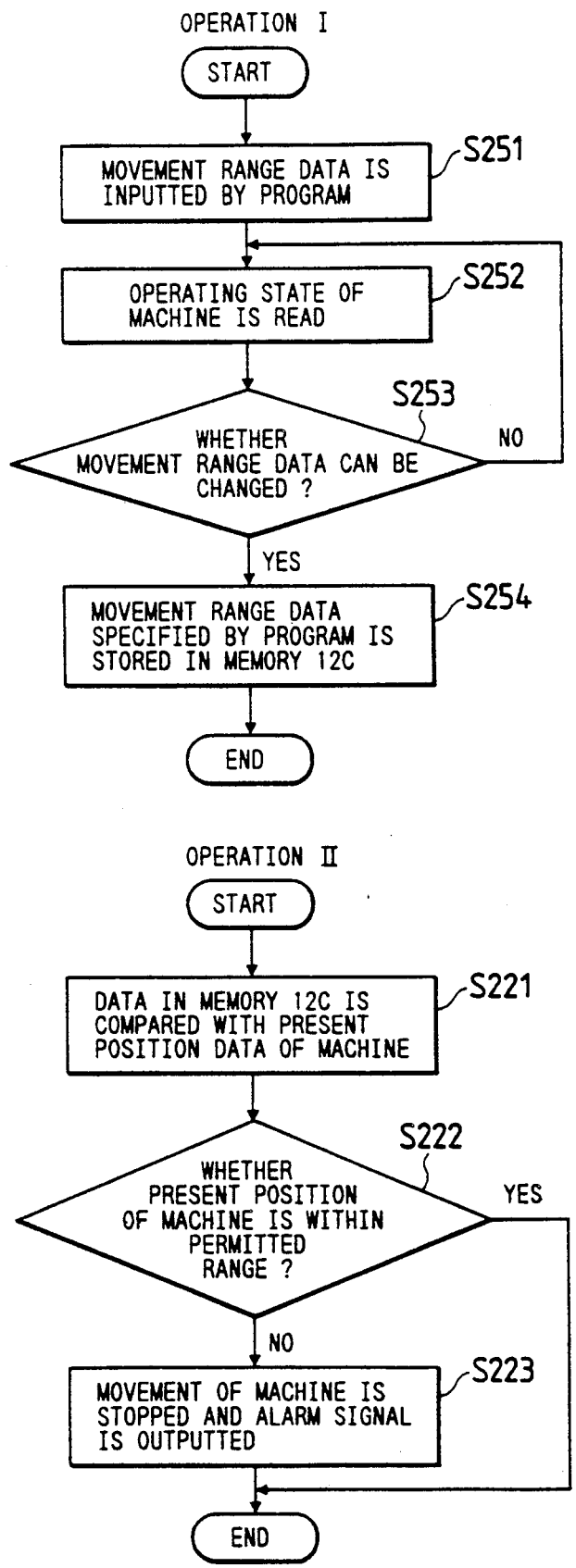

CONTROL DEVICE FOR INDUSTRIAL MACHINE

BACKGROUND OF THE INVENTION

This invention relates to a control device for an industrial machine comprising a numerical control device (hereinafter referred to as "an NC device" when applicable).

FIG. 1 shows the arrangement of a conventional control device comprising an NC device 10. In FIG. 1, reference numeral 1 designates a memory comprising a RAM, which stores programs and data; 2, a control section essentially including a CPU 2a, which controls the functions of the NC device in accordance with the system software loaded in the memory 1; 3, an arithmetic operation section for performing numerical operations under the control of the control section 2; 4, a tape reader for reading a paper tape in which an NC machining program (hereinafter referred to merely as "a machining program", when applicable) has been stored by perforation; 5, a program interface; 6, a feed shaft drive section including a servo amplifier etc.; 7, a feed shaft motor for driving a feed shaft; 8, a feed shaft encoder for outputting a feedback signal; and 9, an input/output signal interface provided for input signals which are used to start and stop the NC device, and for output signals such as NC device state signals and auxiliary function signals for controlling external equipment. Instead of the paper tape, a floppy disc may be employed.

Further in FIG. 1, reference numeral 20 designates a speed reducer; 21, a drive mechanism such as a ball screw; 22, a movable table of a machine, namely, a workpiece mounting stand; 26, a spindle unit; 27, a spindle motor; 28, a spindle amplifier for amplifying a spindle motor drive signal; 30, a gear unit for converting the speed of the spindle motor 27 into a value suitable for a tool 16; 31, a spindle head which holds the tool 16 and transmits the torque of the spindle motor 27 to the tool 16 through the gear unit 30; 32, spindle encoder coupled to the spindle head directly in a rate of 1:1, the spindle encoder 32 being a detector to which rotation of the tool 16 is transmitted as it is; and 33, a spindle encoder interface to apply the output of the spindle encoder 32 to the control section.

In machining a workpiece 15 with the above-described machine, the feed of the movable table 22 is synchronized with the rotation of the tool 16, which is a tapping tool in this case. In the case of FIG. 1, the workpiece 15 is moved, however, it goes without saying that, with the workpiece 15 held stationary, the spindle unit 26 may be moved by the feed shaft motor 7 while the tool 16 is being rotated.

In a tapping operation with the conventional control device, it is necessary to detect the speed of rotation of the tapping tool, and accordingly it is necessary to use the spindle encoder 32 to which the speed of rotation of the tapping tool is transmitted as it is.

On the other hand, in some of practical machines, because of the structure of the spindle unit, the spindle encoder 32 can not be suitably positioned as shown in FIG. 1. Such machines suffer from a difficulty that, for example, in the case of a single-threaded screw, it is difficult to feed the feed shaft one pitch with one revolution of the tapping tool.

In the case of a spindle unit in which the tapping tool is automatically replaced, the tapping tool is replaced by exchanging the spindle head 31 together with a part of the gear unit 30, i.e., together with one of the gears forming the gear unit 30. In this case, the spindle encoder 32 must be replaced together with the spindle head. Thus, the spindle unit is unavoidably intricate in structure.

Further, on the way of the machining operation under the control of the control device, when the machining operation is suspended due to an accident such as tool breakage, in order to start the machining operation again, the operator manually operates an operating panel (not shown) having a character and pattern display section and a keyboard. More specifically, various operations such as movement of the machine to a tool exchanging position, replacement of a tool, operation of a program restarting switch, search for a machining program, the setting of an M code, S code and T code, and movement of the shaft for restart and restoration are manually performed by the operator.

That is, with the conventional control device, the machining operation is restarted manually so that it takes a lot of time and labor to start the machining operation again if suspended.

Furthermore, the machining operation must be free from the accident that the movable table 22 is moved beyond the permitted range to break the machine or to interfere the workpiece with the tool. For this purpose, as shown in FIG. 2, limit switches 23 are provided. That is, when the movable table 22 is moved beyond the permitted range of movement, the limit switch 23 is activated to output a signal to stop the operation of the machine so that the movable range of the movable table 22 is limited.

With the conventional control device as described above, the range of movement of the movable table 22 is determined by the positions of the limit switches 23. Therefore, when it is required to change the range of movement, the limit switches 23 must be reinstalled. This will take a lot of time and labor.

SUMMARY OF THE INVENTION

Accordingly, an object of this invention is to eliminate the above-described difficulties accompanying a conventional control device. More specifically, an object of the invention is to provide a control device which permits the synchronous operation of the spindle unit and the feed shaft even in a machine in which it is difficult to install a spindle encoder coupled directly to a spindle head and also in a machine in which a tool is replaceable.

Another object of the invention is to provide a control device in which a first control device, namely, an NC device is provided with a machining program data memory which, when a machining operation is suspended, stores the data of the machining program in use, and with the aid of a second control device, namely, a programmable controller for performing the sequence control of the machine, the operation of the machine is automatically suspended and restarted.

Still another object of the invention is to provide a control device in which the range of movement of a movable table (a machine movement range) can be changed.

In a first embodiment of this invention, the spindle gear ratio data corresponding to a tool is transferred from a programmable controller to an NC device, and the actual speed of rotation of the tool is calculated by using the spindle gear ratio data thus transferred and the feedback signal of a spindle motor, so that the synchronous operation of the spindle and the feed shaft is performed.

In a second embodiment of the invention, different spindle gear ratio data have been stored for different tools, respectively, in advance, and, when a tool is specified according to a machining program, the spindle gear ratio data for the tool thus specified is selected, and the actual speed of rotation of the tool is calculated by using the gear ratio data thus selected and the feedback signal of a spindle motor, so that the synchronous operation of the spindle and the feed shaft is performed.

In the first embodiment of the invention, in correspondence to the tool held by a spindle head, the spindle gear ratio data corresponding to the tool is transferred from the programmable controller to the NC device, and the actual speed of rotation of the tool is calculated by using the gear ratio data and the feedback speed of the spindle motor. Therefore, the speed of rotation of the tool can be detected independently of the structure of the machining apparatus, and even in the case of machining a workpiece with a plurality of exchanged tools, the speed of rotation of each of the tools can be detected with ease.

In the second embodiment of the invention, when a tool number is specified according to a machining program, the spindle gear ratio data corresponding to the tool number thus specified is read from a spindle gear ratio data memory in which a plurality of spindle gear ratio data have been stored in advance, and the actual speed of rotation of the tool is calculated by using the gear ratio data thus read and the feedback signal of the spindle motor. Therefore, the speed of rotation of the tool can be detected independently of the structure of the machining apparatus, and even in the case of machining a workpiece with a plurality of exchanged tools, the speed of rotation of each of the tools can be detected with ease.

In a third embodiment of the present invention, there are provided a first control device including a data processing section which essentially comprises a memory and a central processing unit to analyzes and operate numerical data inputted through an input unit, and, according to outputs of the data processing section, performs the numerical control of a machine to be controlled thereby; a second control device comprising at least a memory and a central processing unit, to perform the sequence control of the machine according to a predetermined program; and a bus connected between the first and second control device, to transmit data therebetween, the first control device having a machining program data memory for storing, when a machining operation is suspended, the data of a machining program in execution, the second control device including suspension and restart means which, when a trouble occurs with a machining operation, performs an operation of suspending the operation of the machine, and an operation of restarting the operation of the machine according to the data stored in the machining program data memory.

In the control device according to the third embodiment, the first control device for performing the numerical control of a machine to be controlled has the machining program data memory which, when a trouble takes place with the machine, stores the data of the machining program in execution, and, when a trouble occurs with the machine, with the aid of the second control device for performing the sequence control of the machine, the operation of the machine is suspended, and it is started again according to the data stored in the machining program data memory. Therefore, the operation of the machine is automatically started again, when suspended because of the occurrence of a difficulty.

With a control device according to a fourth embodiment of the invention, the movement range data corresponding to a workpiece to be machined is transferred from a programmable controller (PC) and stored in a movement range data memory, and the movement range of the machine is limited according to the data.

With a control device according to a fifth embodiment of the invention, different movement range data has been stored for different workpieces in advance, respectively, and the movement range specifying data corresponding to a workpiece to be machined is transferred through a bus from a programmable controller (PC), to select the movement range data corresponding to the movement range specifying data thus transferred, and the movement range of the machine is limited according to the movement range data thus selected.

With a control device according to a sixth embodiment of the invention, the movement range data specified according to a machining program is stored in a movement range data memory, and the movement range of the machine is limited according to the data thus stored.

In the fourth embodiment of the invention, the PC transfers movement range data to the NC device according to the kind of a workpiece to be handled, and the machine movement range is limited according to the movement range data thus transferred, that is, it is changed according to the kind of workpiece to be machined.

In the fifth embodiment of the invention, according to the movement range specifying data transferred from the PC in correspondence to the kind of a workpiece to be machined, the corresponding one is selected from the data stored in the movement range data memory, and the machine movement is limited according to the data thus selected, that is, it is changed according to the kind of a workpiece to be machined.

In the sixth embodiment of the invention, the machine movement range is limited according to the machine movement range data which is specified according to the machining program selected for the kind of a workpiece, that is, it is changed according to the kind of a workpiece to be machined.

BRIEF DESCRIPTION OF THE DRAWINGS

FIG. 3 is an explanatory diagram, partly as a block diagram, showing the arrangement of a first embodiment of this invention, FIG. 16 is a flow chart for a description of the operation of a sixth embodiment of the invention.

DETAILED DESCRIPTION OF THE EMBODIMENTS

Figure 4:
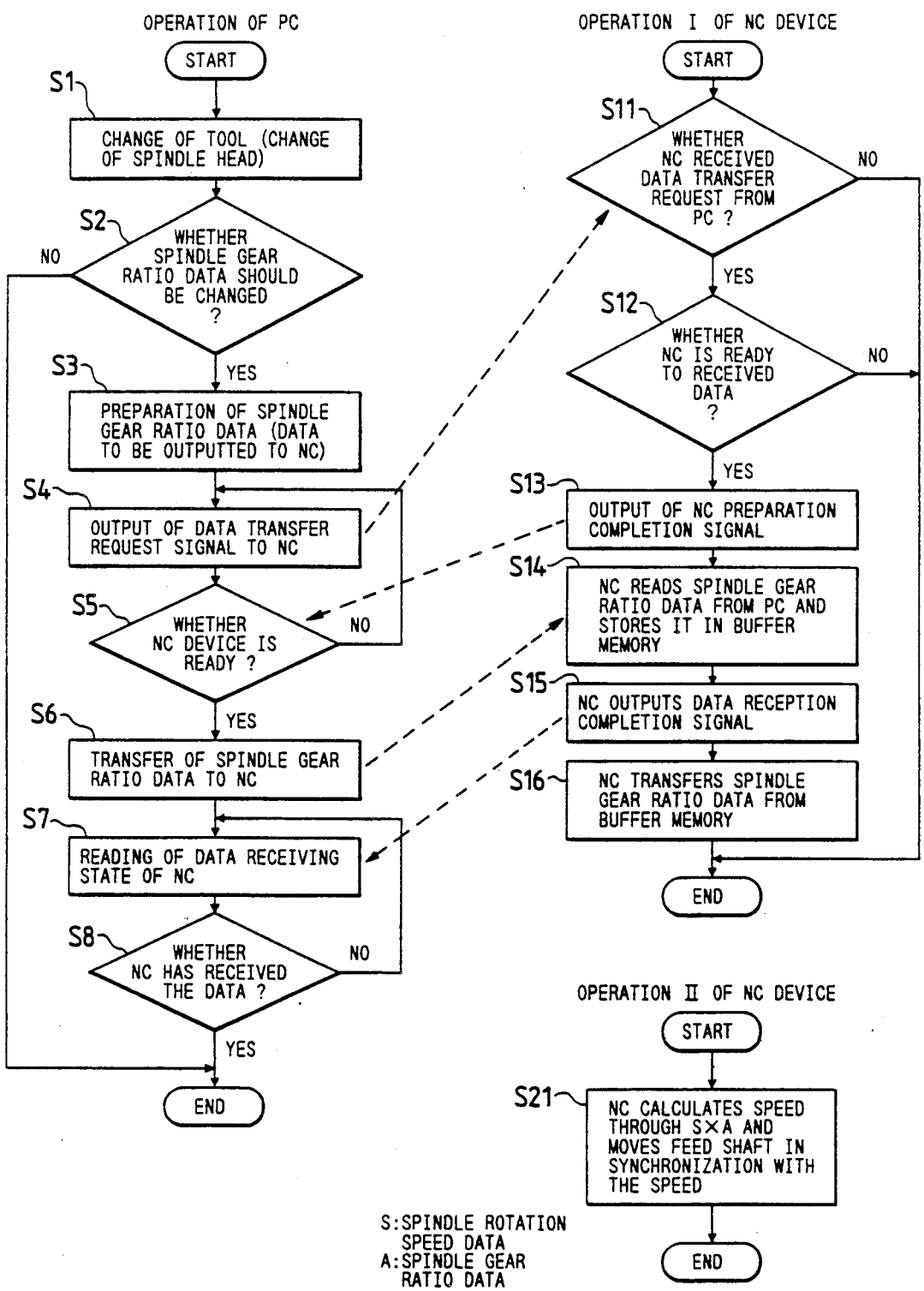
FIG. 4 is a flow chart for a description of the operation of the first embodiment.

FIG. 3 is a diagram showing the arrangement of a first embodiment of this invention, and FIG. 4 is a flow chart for a description of the operation of the first embodiment.

Figure 1:
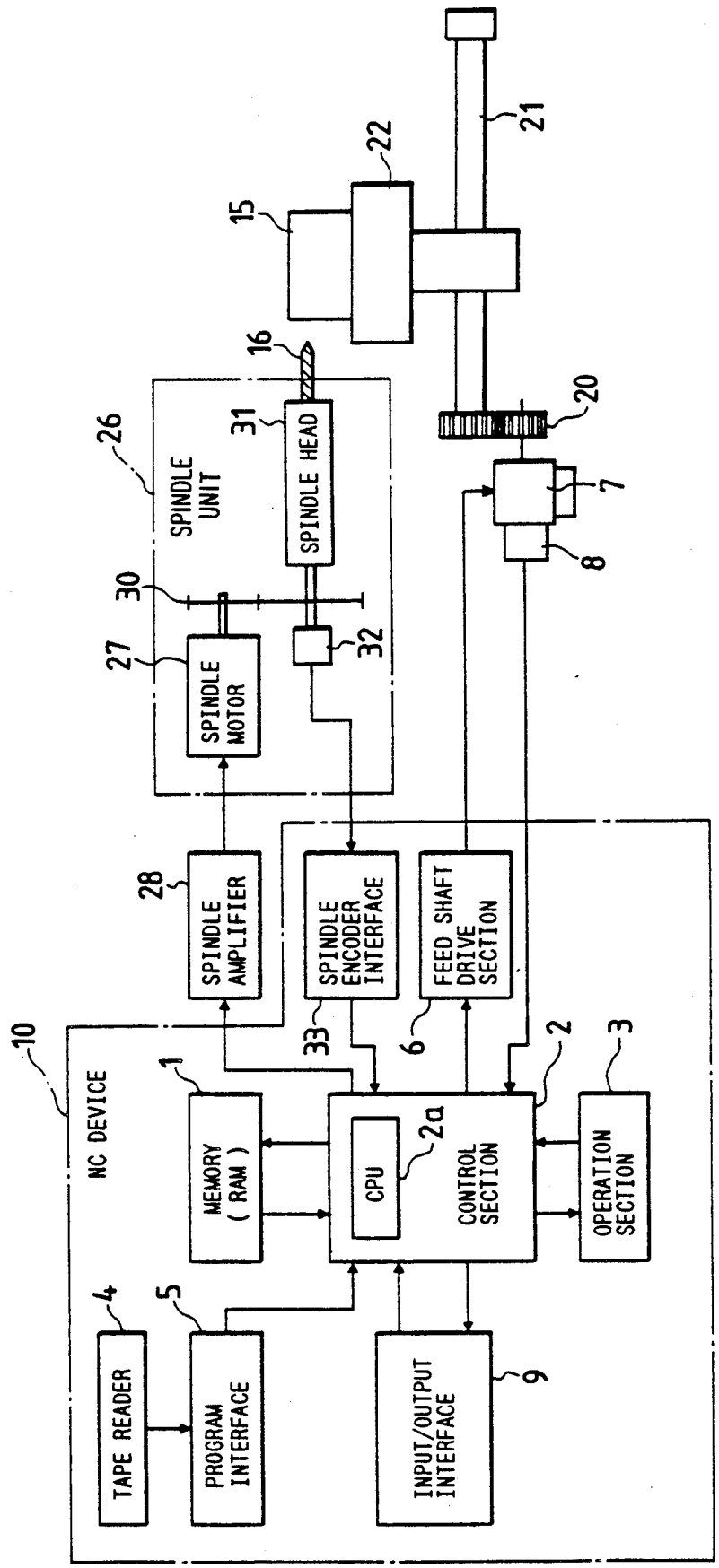
FIG. 1 is an explanatory diagram, partly as a block diagram, showing the arrangement of a conventional control device for an industrial machine.
Figure 2:
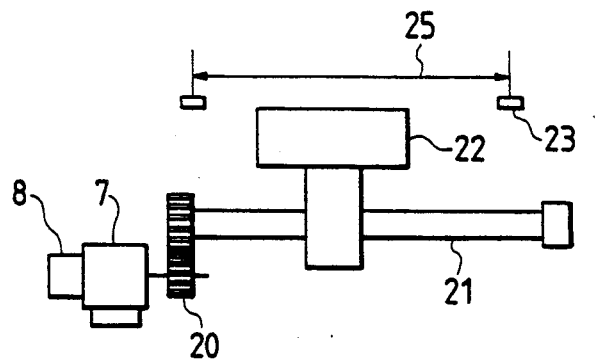
FIG. 2 is an explanatory diagram showing one example of a machine to be controlled by a control device.

In FIG. 3, those components which have been already described with reference to FIG. 1 are therefore designated by the same reference numerals or characters. Further in FIG. 3, reference numerals 151, 152 and 153 designate workpieces different in kind. More specifically, the workpieces 151, 152 and 153 are different in configuration, in material and/or in the contents of machining. Therefore, they are machined with different tools 16. That is, the workpiece 152 is machined with a tool 16a, and the workpiece 153 is machined with a tool 16b. The workpiece 151 is a finished one.

In the case of FIG. 3, the workpiece 152 is going to be machined, the workpiece 151 has been machined and moved away from the machining apparatus, and the workpiece 153 is going to be loaded in so as to be machined after the workpiece 152. In FIG. 3, an arrow 18 of a one-dot chain line indicates the direction of flow of workpieces, and reference numerals 171, 172 and 173 designate sensors for identifying the kinds of the workpieces.

Further in FIG. 3, reference numeral 130 designates a programmable controller (PC) for performing a sequence control; 131, a CPU; 132, a memory for storing a control procedure in the form of a series of instruction words and necessary data; and 133a and 133b, input-/output interfaces.

The NC device 10 is coupled to the PC 130 through the input/output interfaces 9 and 133a and a parallel bus 35, so that control signals and state signals are transmitted therebetween through the parallel bus 35 at high speed.

Further in FIG. 3, reference numeral 12a designates a gear ratio data memory for storing gear ratio data applied thereto from the PC 130. The term "gear ratio data" as used herein is intended to mean the gear ratio of the gear unit 30 through which the spindle motor 27 is coupled to the spindle head 31 holding the tool 16. More specifically, the gear ratio of the gear 30a and the gear 30ba is specified by A, and the gear ratio of the gear 30a and the gear 30bb is specified by B.

In the first embodiment, unlike the conventional machine shown in FIG. 1, the spindle encoder 32 is coupled directly to the spindle motor 27. In FIG. 3, the arrow 34 means that the spindle head is replaceable.

An operation of storing data in the gear ratio data memory 12a will be described.

First, a PC control operation will be described with reference to a flow chart shown in FIG. 4. In Step S1, the PC reads external conditions, and operates to replace the tool 16, that is, to replace the spindle head having the tool 16. In Step S1, the PC operates according to the sequence control procedure to unload the workpiece 151 from the movable table 22 and to fixedly load the workpiece 152 thereon. Thereafter, the PC reads the output signal of the sensor 172, to detect the kind of the workpiece.

Assignment of machining programs to workpieces has been programmed in the PC, that is, different machining programs have been provided for different workpieces. Therefore, upon detection of the kind of the workpiece, the PC 130 applies a machining program selection signal to the NC device 10. In response to the selection signal, the NC device selects the corresponding machining program. As the machining program specifies a tool to be used, the NC device supplies a tool specifying signal through the bus 35 to the PC 130. The PC 130 operates to replace the tool according to the tool specifying signal. That is, the spindle head (not shown) holding the tool which has machined the workpiece 151 is removed, and the spindle head 31a is mounted on the spindle 26 with the gears 30ba and 30a engaged with each other.

In Step S2, it is determined from the kind of the workpiece whether or not the spindle gear ratio data should be changed. If "yes", then in Step S3, the PC selects the corresponding gear ratio data A from those which have been stored, thus being ready to transmit it to the NC device 10. In Step S4, the PC 130 issues a data transfer request to the NC device 10. In Step S5, it is detected whether or not the NC device 10 is ready to receive the data. If "no", Step S4 is effected again. If "yes", in Step S6, the PC 130 transfers the spindle gear ratio data A to the NC device 10. In Step S7, the PC reads the data receiving state of the NC device 10. In Step S8, it is determined whether or not the NC device 10 has received the data. If "no", Step S7 is effected again. If "yes", the operation is ended. If, in Step S2, the result of the determination is "no", the operation is ended because it is unnecessary to change the spindle gear ratio.

Now, a first operation of the NC device (hereinafter referred to as "an operation I", when applicable) will be described. In Step S11, it is determined whether or not the NC device has received the data transfer request from the PC 130. If "yes", in Step S12, it is determined whether or not the NC device is ready to receive the data. If "yes", in Step 13, an NC device preparation completion signal is outputted. Next, in Step S14, the NC device reads the spindle gear ratio data A from the PC 130, and stores it in a buffer memory in the input/output interface. Then, in Step S15, the NC device supplies a data reception completion signal to the PC 130, and in Step S16, it transfers the spindle gear ratio data A from the buffer memory to the gear ratio data memory 12a. Thus, the operation I has been accomplished.

In FIG. 4 the broken line arrows indicate the transferring of data through the bus 35.

After the gear ratio data has been stored in the gear ratio data memory 12a in the above-described manner, the NC device performs a second operation (hereinafter referred to as "an operation II", when applicable) for synchronous operation of the spindle and feed shaft.

Upon reception of a start instruction from the PC 130, the NC device 10 start the numerical control of the machine to be controlled. In Step S21, the NC device calculates the actual speed of rotation of the tool from expression $S \times A$), and moves the feed shaft in synchronization with the speed of rotation of the tool.

This will be described in more detail. When, in response to a spindle motor rotation instruction, the spindle motor 27 rotates at the specified speed S, the tool 16a held by the spindle head 31a is rotated at the speed of $(S \times A)$. Therefore, if the speed of rotation S of the spindle motor which is detected by the spindle encoder 32 coupled directly to the spindle motor 27 is fed back to the control section 2 through the spindle encoder interface 33, the operation $(S \times A)$ is performed using data A in the gear ratio data memory 12a and the speed of rotation S, so that the speed of rotation $(S \times A)$ of the tool 16a can be detected in real time. Therefore, application of the speed of the feed shaft motor 7 in real time which is synchronous with the speed of rotation $(S \times A)$ allows the synchronous operation of the spindle and the feed shaft.

When the workpiece 153 is going to be machined after the workpiece 152 has been machined, similarly as in the above-described case, the spindle head 31a is replaced by the spindle head 31b, and the gear ratio data B is transmitted from the PC 130 to the NC device 10, where it is stored in the memory 12a. As a result an operation of $(S \times B)$ is performed, to calculate the actual speed of rotation of the tool 16b. And the feed shaft is moved in synchronization with the speed of rotation thus calculated.

Figure 5:
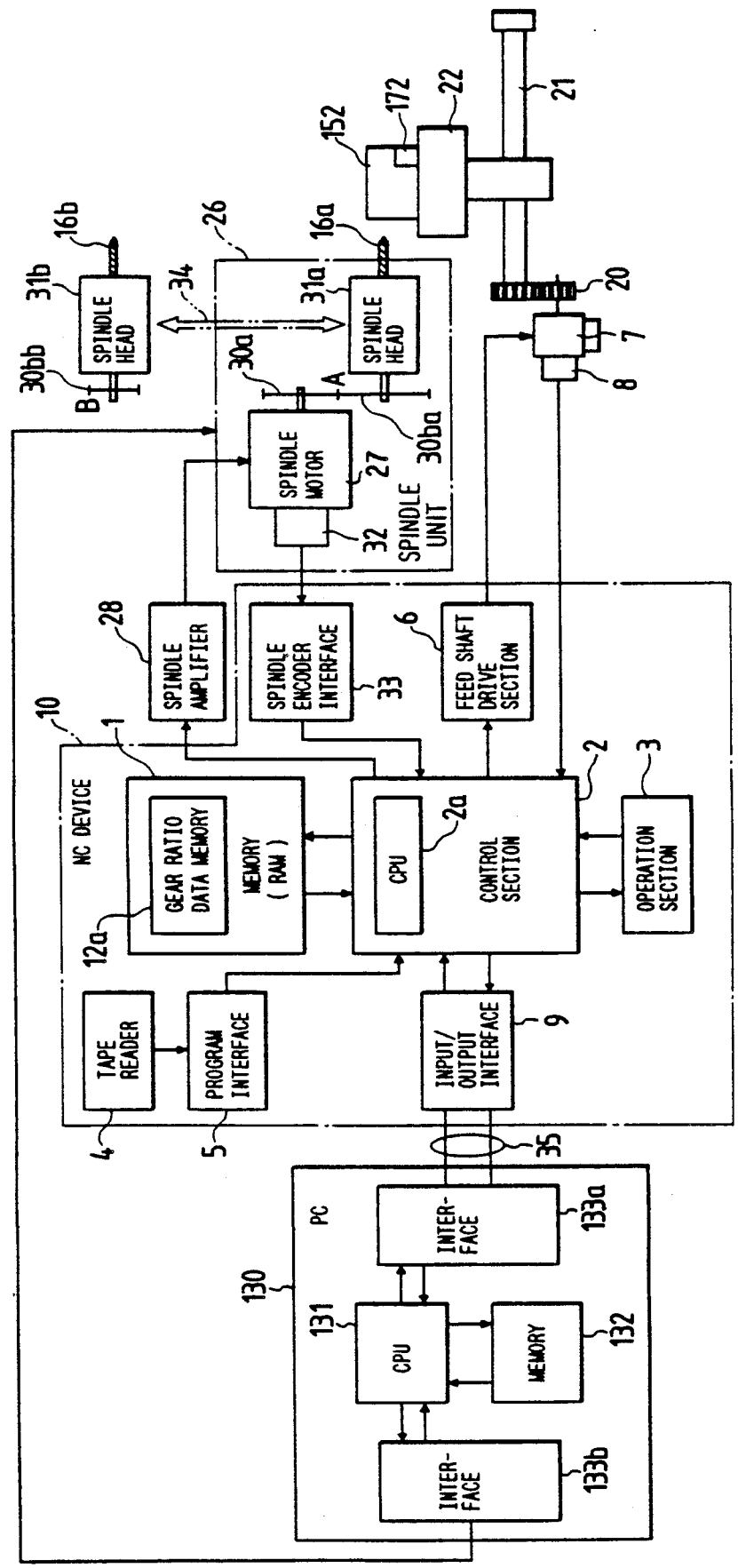
FIG. 5 is an explanatory diagram, partly as a block diagram, showing the arrangement of a second embodiment of the invention.

Now, a second embodiment of the invention will be described. FIG. 5 is a diagram showing the arrangement of the second embodiment of the invention. In FIG. 5, those components which have been already described with reference to FIG. 1 are therefore designated by the same reference numerals or characters In the case of FIG. 5, one workpiece is machined with a plurality of tapping tools.

Figure 6:
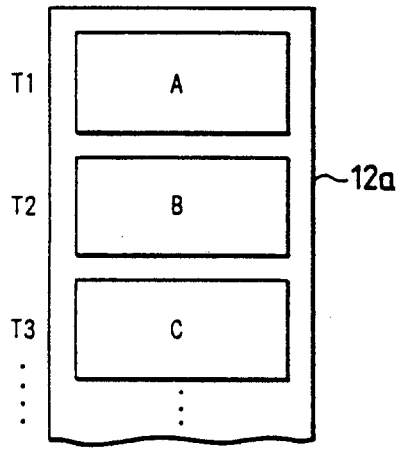
FIG. 6 is an explanatory diagram showing a gear ratio data memory in the second embodiment.

FIG. 6 is an explanatory diagram showing a gear ratio data memory 12a in the second embodiment of the invention. The memory 12a is provided in the memory 1 of the NC device 10. In FIG. 6, reference characters A, B, C, . . . designate gear ratio data which have been stored, as parameters, in the memory 12a. More specifically, the gear ratio data A indicates the gear ratio of the spindle head holding a tapping tool with a tool number T1; the gear ratio data B indicates the gear ratio of the spindle head holding a tapping tool with a tool number T2; the gear ratio data C indicates the gear ratio of the spindle head holding a tapping tool with a tool number T3; and so on.

Now, the operation of the second embodiment of the invention will be described.

Figure 7:
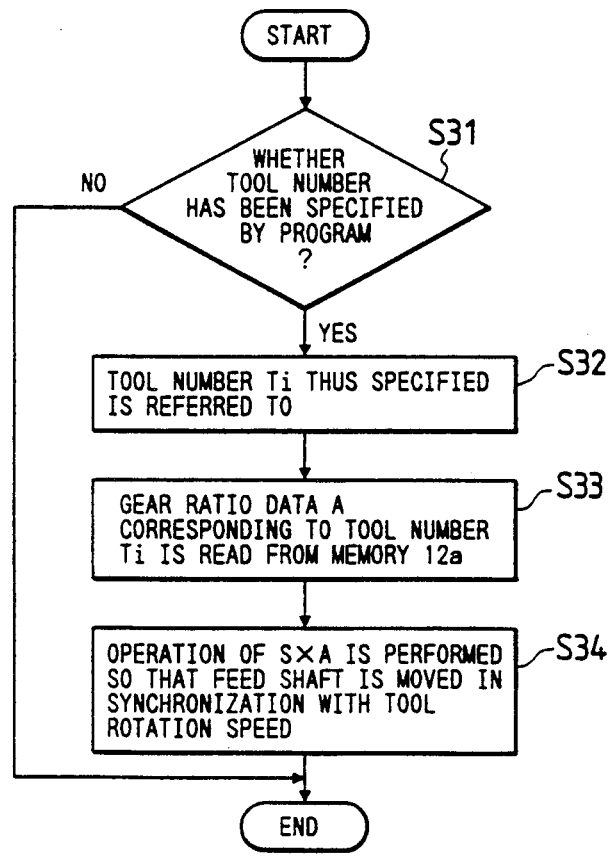
FIG. 7 is a flow chart for a description of the operation of the second embodiment.

FIG. 7 is a flow chart for a description of the synchronous operation of the spindle and the feed shaft by the NC device. In Step S31, it is detected whether or not a tool number has been specified according to the machining program. If "yes", then in Step S32, the tool number T1 thus specified is referred to. In Step S33, the gear ratio data A corresponding to the tool number T1 is read from the memory 12a. In Step S34 an operation of $(S \times A)$ is performed, so that the feed shaft is moved in synchronization with the speed of rotation of the tool.

The operation in Step S34 is equal to that in Step S21 of the first embodiment shown in FIG. 4.

The NC device 10 operates in the above described manner. On the other hand, the PC 130 performs a sequence control as follows When, in Step S31, the result of the determination is "yes", that is, when the tool number T1 is specified, the tool number T1 is transferred through the bus 35 to the PC 130. In response to the tool number, the PC 130 performs the sequence control for replacement of the tool, as a result of which the spindle head holding the tapping tool having the tool number T1 is mounted on the spindle 26.

When the tool number T2 is specified according to the machining program, the operation is carried out similarly as in the above-described case. As a result, the spindle head 31a is replaced by the spindle head 31b, and the gear ratio data B is read from the gear ratio data memory 12a, to perform an operation of $(S \times B)$ to detect the speed of rotation of the tool. Thus, the synchronous operation of the spindle and the feed shaft is carried out.

In the second embodiment, no gear ratio data is transferred between the PC 130 and the NC device 10. Therefore, the second embodiment is also applicable to the case where the automatic tool replacement by the PC 130 is not carried out, that is, the machining apparatus is made up of the NC device 10 and a machining means only, and the tool is replaced manually.

As was described above, in the first embodiment of the invention, the actual speed of rotation of the tool held by the spindle head is calculated from the speed of rotation of the spindle and the spindle gear ratio data corresponding to the tool, to perform the synchronous operation of the spindle and the feed shaft. Therefore, in the case where, because of the structure of the machine, it is impossible to install the detector coupled directly to the spindle head, or in the case where the machining operation is carried out with a plurality of tools, the synchronous operation of the spindle and the feed shaft can be achieved with ease.

In the second embodiment of the invention, as was described above, no gear ratio data is transferred between the PC and the NC device, that is, the machining apparatus is operated with the NC device only. The second embodiment has the same effect as the first embodiment, and is applicable to the case, too, where no PC sequence control is carried out.

Figure 8:
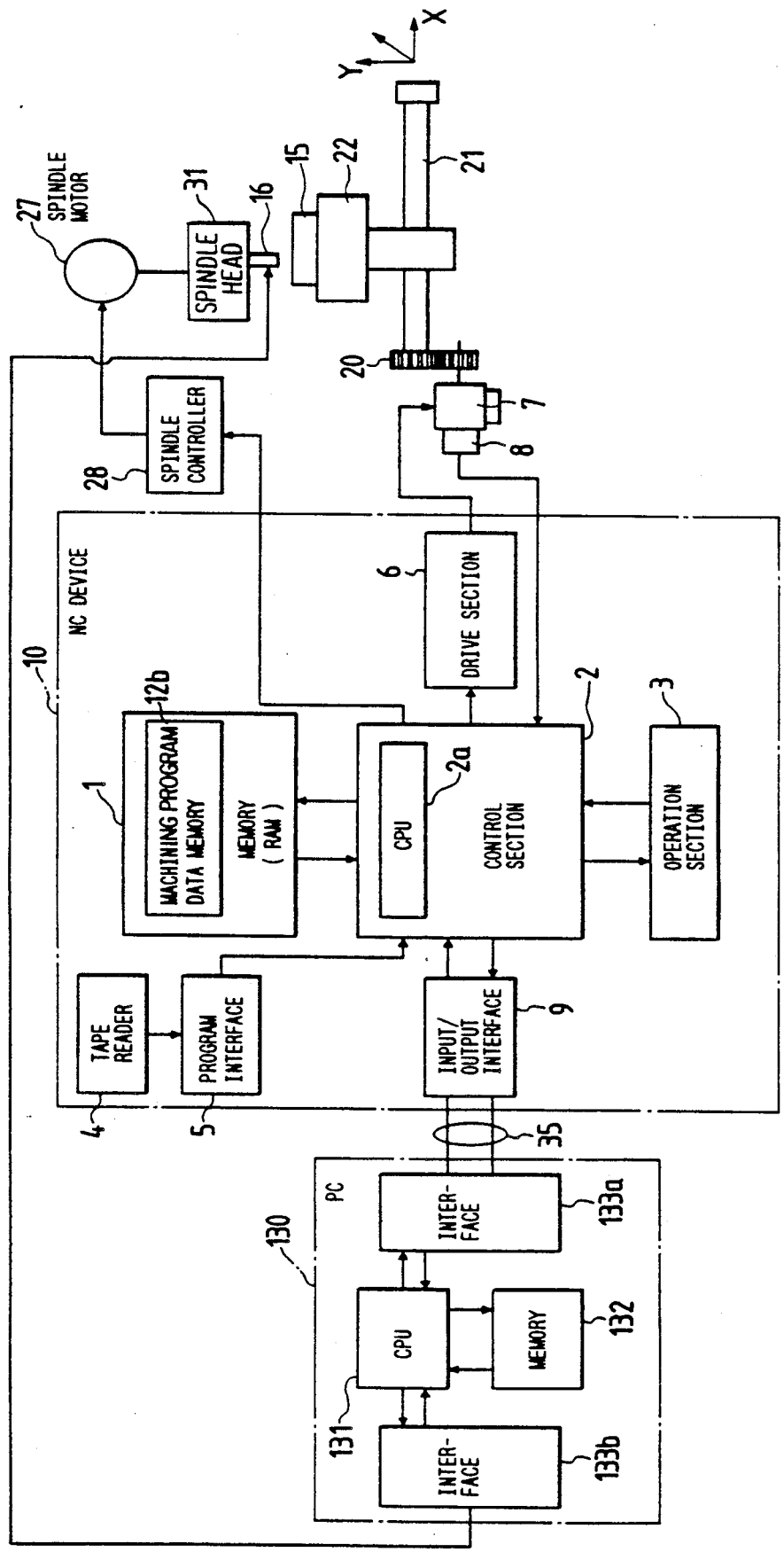
FIG. 8 is an explanatory diagram, partly as a block diagram, showing the arrangement of a third embodiment of this invention.
Figure 9:
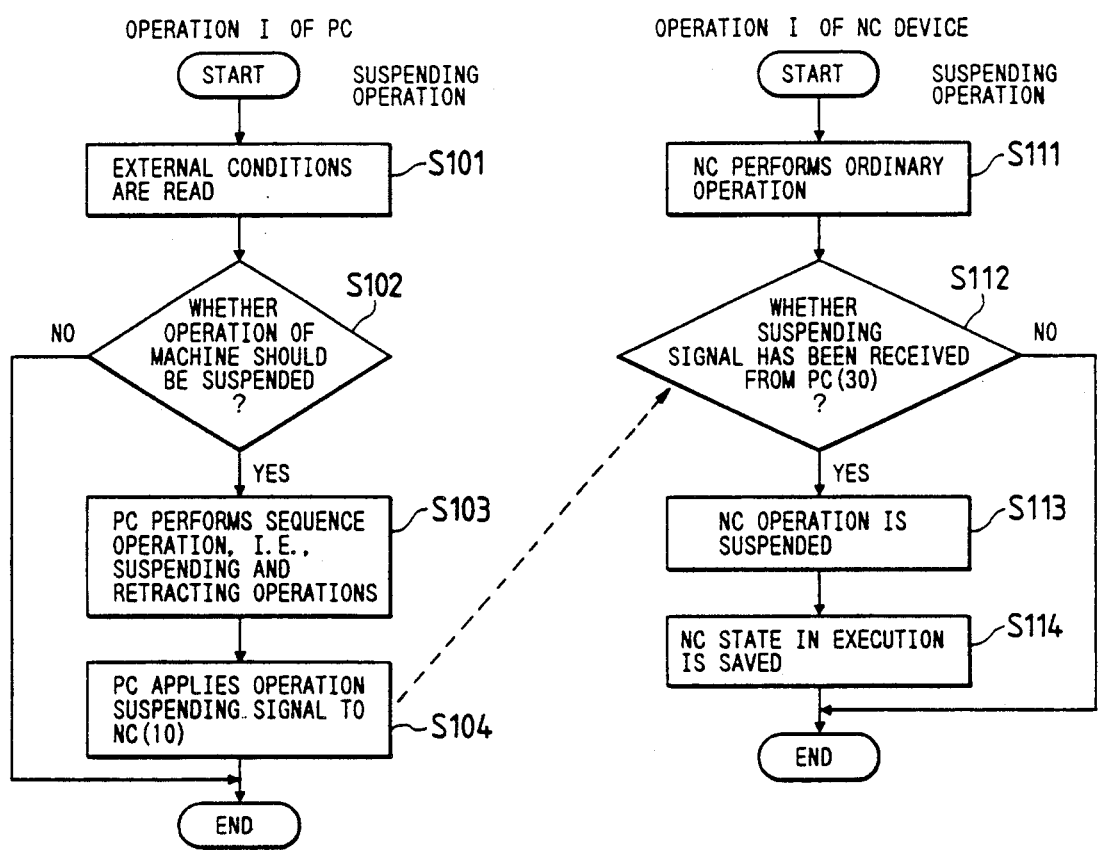
FIG. 9 is a flow chart for a description of a suspending operation in the third embodiment.
Figure 10:
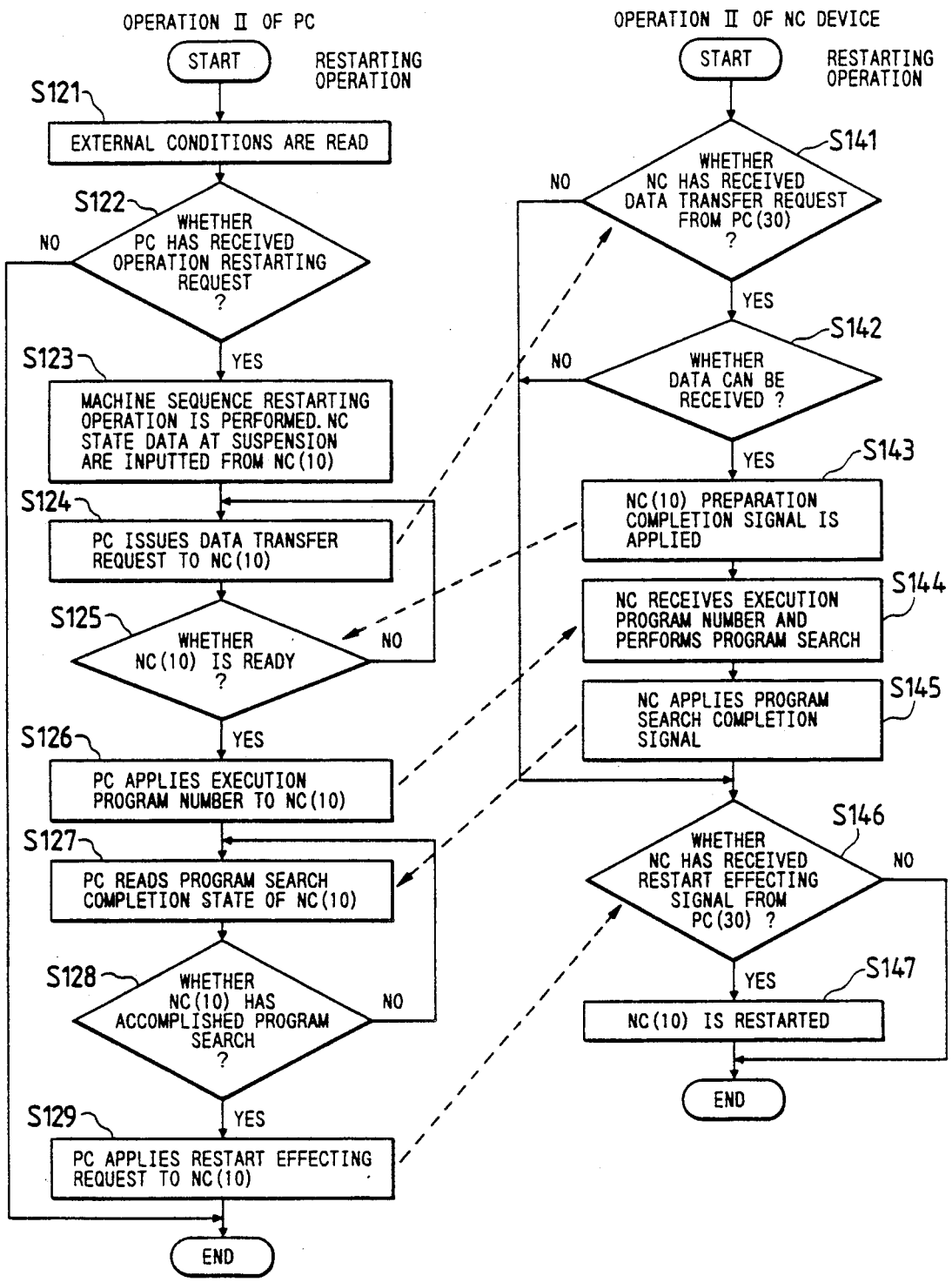
FIG. 10 is a flow chart for a description of a restarting operation in the third embodiment.

FIG. 8 is an explanatory diagram, partly as a block diagram, showing the arrangement of the third embodiment of this invention. FIGS. 9 and 10 are flow charts for a description of the operation of the third embodiment shown in FIG. 8.

In FIG. 8, those components which have been already described with reference to FIGS. 1 and 3 are therefore designated by the same reference numerals or characters. Further in FIG. 8, reference numeral 12b designates a machining program data memory which, when a machining operation is suspended, stores the data of the machining program in execution. The term "data of a machining program" as used herein is intended to mean a program number, sequence number, block number, G code, M code, S code and T code.

The operation of the third embodiment will be described with reference to the flow charts of FIGS. 9 and 10.

First, an operation of suspending a machining operation, that is, a first operation of the PC 130 (hereinafter referred to as "an operation I of the PC", when applicable) and a first operation of the NC device 10 (hereinafter referred to as "an operation I of the NC device", when applicable) will be described.

In Step S101, the PC 130 reads external conditions. In Step 102, it is determined whether or not the operation of the machine should be suspended. If "yes", then in Step 103, the PC performs a sequence operation, i.e., a suspending operation and a retracting operation. In Step 104, the PC applies an operation suspending signal to the NC device 10.

On the other hand, in Step 111, the NC device 10 performs its ordinary numerical control operation. During the operation, the NC device 10 determines whether or not the operation suspending signal has received (Step 112). If "yes", then in Step 113, the NC operation is suspended. Thereafter, in Step 114, the NC state in execution is saved, that is, the program number, sequence number, block number, G code, M code, S code and T code in use at the suspension of the operation are saved.

Thus, the suspending operation has been accomplished. As a result, the operation of the machine is interrupted, and the machine is retracted, for instance, to the tool exchanging position.

A restarting operation, namely, an operation II will be described with reference to FIG. 10.

In Step 121, the PC 130 reads external conditions. In Step S122, it is determined whether or not the PC has received an operation restarting request. If "yes", then in Step 123, a machine sequence restarting operation is performed. In this operation, the NC state date at the suspension of the operation which have been stored in the machining program data memory 12b, that is, the program number, sequence number, block number, G code, M code, S code and T code are inputted as data necessary for restarting the operation. Thereafter, in Step S124, the PC 130 issues a data transfer request to the NC device 10. In Step S125, it is determined whether or not the NC device is ready to receive data. If "no", Step S124 is effected again. If "yes", in Step S126, the PC 130 applies the execution program number to the NC device 10 In Step S127, the PC reads the NC device's program search completion state. In Step S128, it is determined whether or not the NC device has accomplished the program search If "no", Step S127 is effected again. If "yes", the PC applies a restart effecting request to the NC device 10.

On the other hand, in Step S141 the NC device 10 detects whether or not it has received the date transfer request from the PC 130 If "yes", in Step S142, it is determined whether or not data can be received If "yes", in Step S143, an NC device preparation completion signal is applied to the PC 130. In Step S144, the NC device receives the execution program number, and performs a program search. Next, in Step S145, the NC device applies a program search completion signal to the PC 130. In Step S146, it is determined whether or not the NC device has received the restart effecting signal from the PC. If "yes", in Step S147, the NC device is restarted Thus, the NC device restarting operation has been accomplished. As a result, the machine is started again to machine the workpiece.

In the above-described embodiment, in the restarting operation, the PC 130 outputs the execution program number. However, it should be noted that, when the machining operation is suspended, depending on the configuration or the like of the workpiece, the latter may be unacceptable as a product, that is, it may be useless to machine it again because it is no longer acceptable as a product, or it may be useful to machine it again, and therefore outputting one of the machining program data, for instance, the program number or sequence number, has been programmed in the PC 130 in advance according to the kind of a workpiece.

In the case where a variety of workpieces flow on one machining line, different sensors are provided on different workpieces, respectively, to identify the kinds of workpieces. The output signals of the sensors are applied to the PC 130, so that the latter 130 identifies the kind of each workpiece, and selects the program corresponding thereto.

The operation of suspending a machining operation and the operation of restarting it are performed under the control of the PC 130 coupled externally to the NC device 10. Therefore, the NC device 10 may be an ordinary one which has fundamental numerical control function, that is, it is unnecessary for the NC device to have additional functions.

The machining program data memory 12b may occupy a region of the memory 1.

As was described above, according to the third embodiment, the first control device for numerically controlling the operation of a machine has the machining program data memory for storing the data of a program in execution at the suspension of a machining operation, and, when a trouble occurs with the machine, with the aid of the second control device for performing a sequence control, the operation of the machine is suspended, and it is started again according to the data stored in the machining program data memory. Thus, when the machining operation is suspended because of the occurrence of a difficulty, it is automatically started again from the position where the difficulty has occurred.

Figure 11:
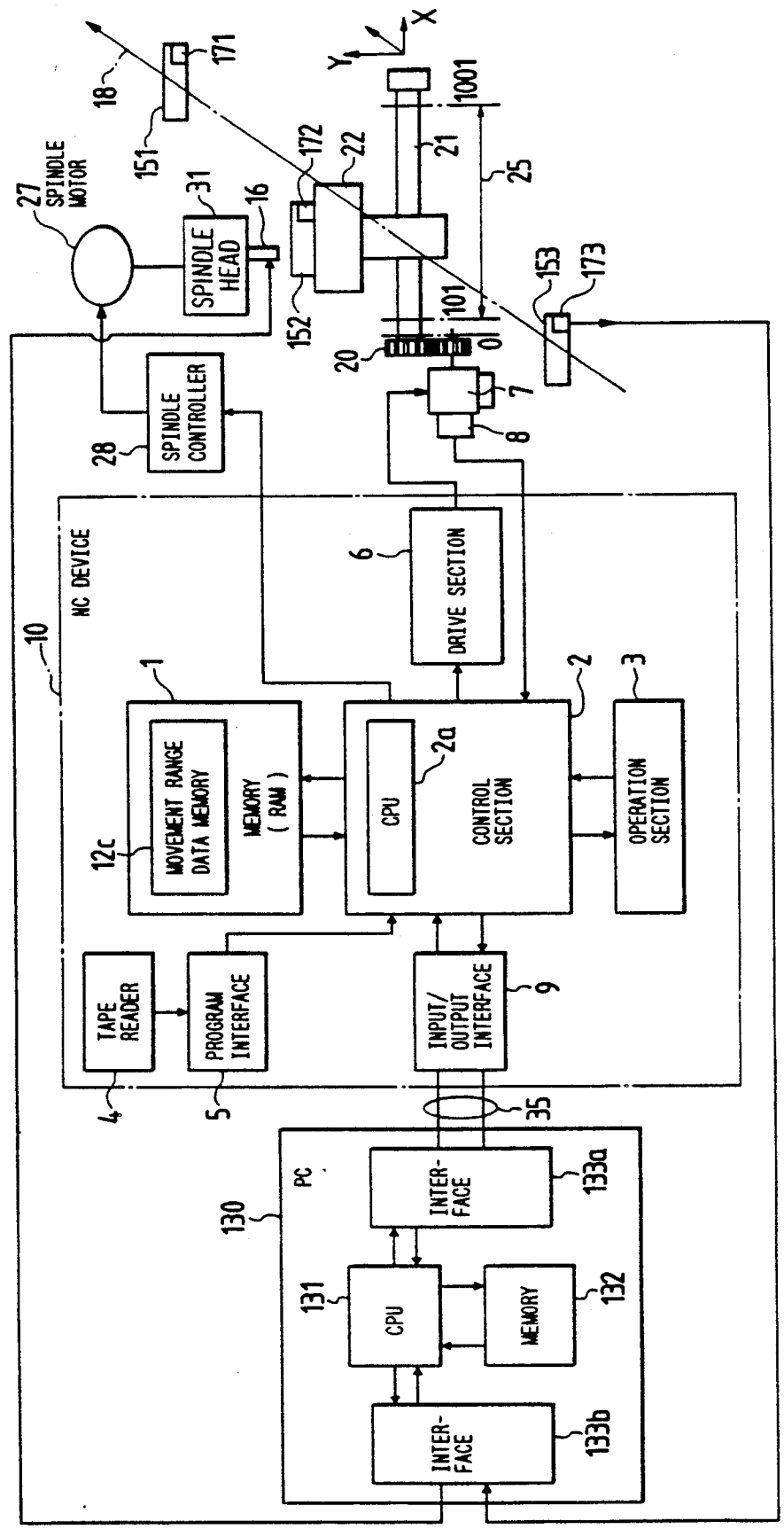
FIG. 11 is an explanatory diagram, partly as a block diagram, showing the arrangement of the fourth embodiment of this invention.
Figure 12:
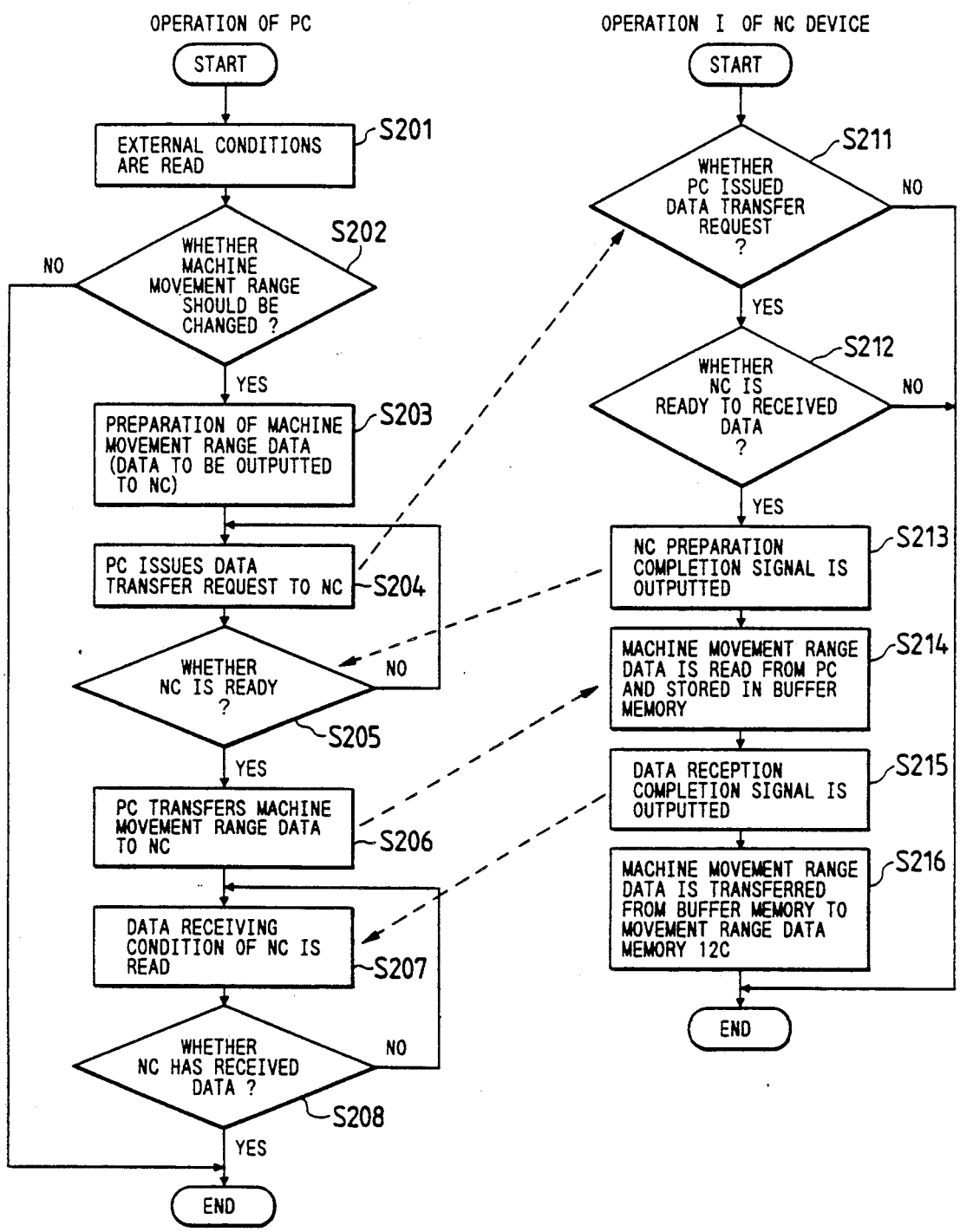
FIG. 12 is a flow chart for a description of the operation of a programmable controller and the operation I of an NC device in the fourth embodiment.

FIG. 11 is a diagram showing the arrangement of a fourth embodiment of this invention, and FIG. 12 is a flow chart for a description of the operation of the fourth embodiment shown in FIG. 11.

In FIG. 11, those parts which have been already described with reference to FIGS. 1 and 3 are therefore designated by the same reference numerals or characters.

Further in FIG. 11, reference numeral 12c designates a movement range data memory for storing movement range data on the machine movement range which is inputted by the PC 130. The movement range data is indicated by the machine coordinates of two points such as points 101 and 1001 on the X axis in FIG. 11.

Now, an operation of storing data in the movement range data memory 12c will be described.

First, the control operation of the PC 130 will be described with reference to the flow chart of FIG. 12. In Step S201, external conditions are read. In Step S201, the PC operates according to the sequence control procedure, to unload the workpiece 151 from the movable table 22, and to fixedly load the second workpiece 152 on the movable table 22 and fix it there. Under this condition, the PC reads the output signal of the sensor 172, to detect the kind of the workpiece.

In advance, machining programs have been determined for workpieces to be handled, respectively. Upon detection of the kind of the workpiece, the PC 130 supplies a machining program selection signal through the bus 35 to the NC device 10. In response to the selection signal, the NC device 10 selects the machining program provided for the workpiece 152. The machining program specifies a tool to be used for the workpiece. Therefore, the NC device 10 applies a tool specifying signal through the bus 35 to the PC 130. According to this signal, the PC 130 replaces the tool.

In Step S202, it is determined according to the kind of the workpiece whether or not the present machine movement range should be changed. If "yes", then in Step S203, the PC reads the corresponding movement range data from memory so as to be ready for transferring it any time. In Step S204, the PC issues a data transfer request to the NC device 10. In Step S205, it is determined whether or not the NC device 10 is ready for receiving the movement range data. If "no", then Step S204 is effected again. If "yes", then in Step S206, the PC transfers the machine movement range data to the NC device 10. Next, in Step S207, the data receiving condition of the NC device 10 is read. In Step S208, it is determined whether or not the NC device 10 has received the data. If "no", then Step S207 is effected again If "yes", the operation is ended. If, in Step S202, the result of determination is "no", it is unnecessary to change the movement range, and accordingly the operation is ended.

Now, a first operation of the NC device 10 (hereinafter referred to as "an operation I", when applicable) will be described.

In Step S211, it is determined whether or not the PC 130 has issued a data transfer request. If "yes", in Step S212, it is determined whether or not the NC device is ready to receive data. If "yes", in Step S213, an NC device 10 preparation completion signal is outputted. Then, in Step S214, the machine movement range data is read from the PC 130 and stored in a buffer memory. In Step S215, the NC device applies a data reception completion signal to the PC 130. And in Step S216, in the NC device, the machine movement range data is transferred from the buffer memory to the movement range data memory 12c. Thus the operation I has been accomplished.

In FIG. 12, the broken line arrows indicate the transfer of data through the bus 35.

When the machine movement range data has been stored in the movement range data memory 12c in the above-described manner, with respect to the limitation of the machine movement range the NC device 10 performs a second operation (hereinafter referred to as "an operation II", when applicable) according to a flow chart shown in FIG. 13.

Upon reception of a start instruction from the PC 130 after the data has been stored in the memory 12c in the above-described manner, the NC device 10 starts the numerical control of the machine to be controlled thereby In Step S221, the data in the memory 12c is compared with the current position of the machine at all times. In Step S222, it is determined whether or not the present position of the machine is within the permitted range of movement. If "no", i.e., if the present position is out of the range, or in the movement-inhibited range, in Step S223, the movement of the machine is stopped and an alarm signal is outputted.

The machine movement range is changed according to the kind of a workpiece to be handled and the kind of a tool to be used in the above-described manner, so that the movement of the machine is limited according to the machine movement range thus changed.

Now, a fifth embodiment of the invention will be described. The fifth embodiment is different from the fourth embodiment described with reference to FIG. 11 only in the contents of the movement range data memory.

Figure 14:
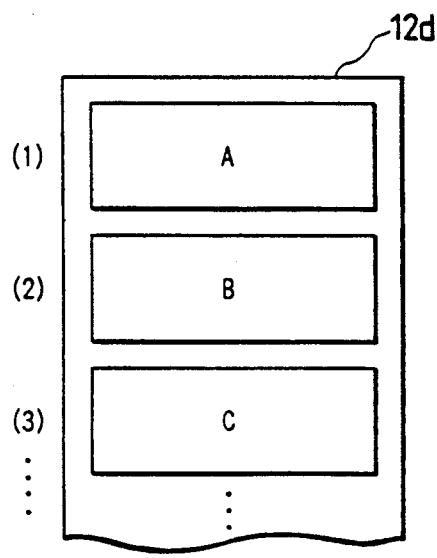
FIG. 14 is an explanatory diagram showing a movement range data memory in a fifth embodiment of the invention.

FIG. 14 is an explanatory diagram showing the movement range data memory 12d of the fifth embodiment. The memory 12d is included in the memory 1 of the NC device 10. In FIG. 14, reference characters A, B, C, ... designate movement range data in the memory 12d which are specified as parameters; (1), (2), (3), ..., movement range specifying data for selecting the data A, B, C, ..., respectively. The movement range specifying data are transferred from the PC 130 to the NC device 10 as described later, and they serve as selection signals for selecting the movement range data.

Figure 15:
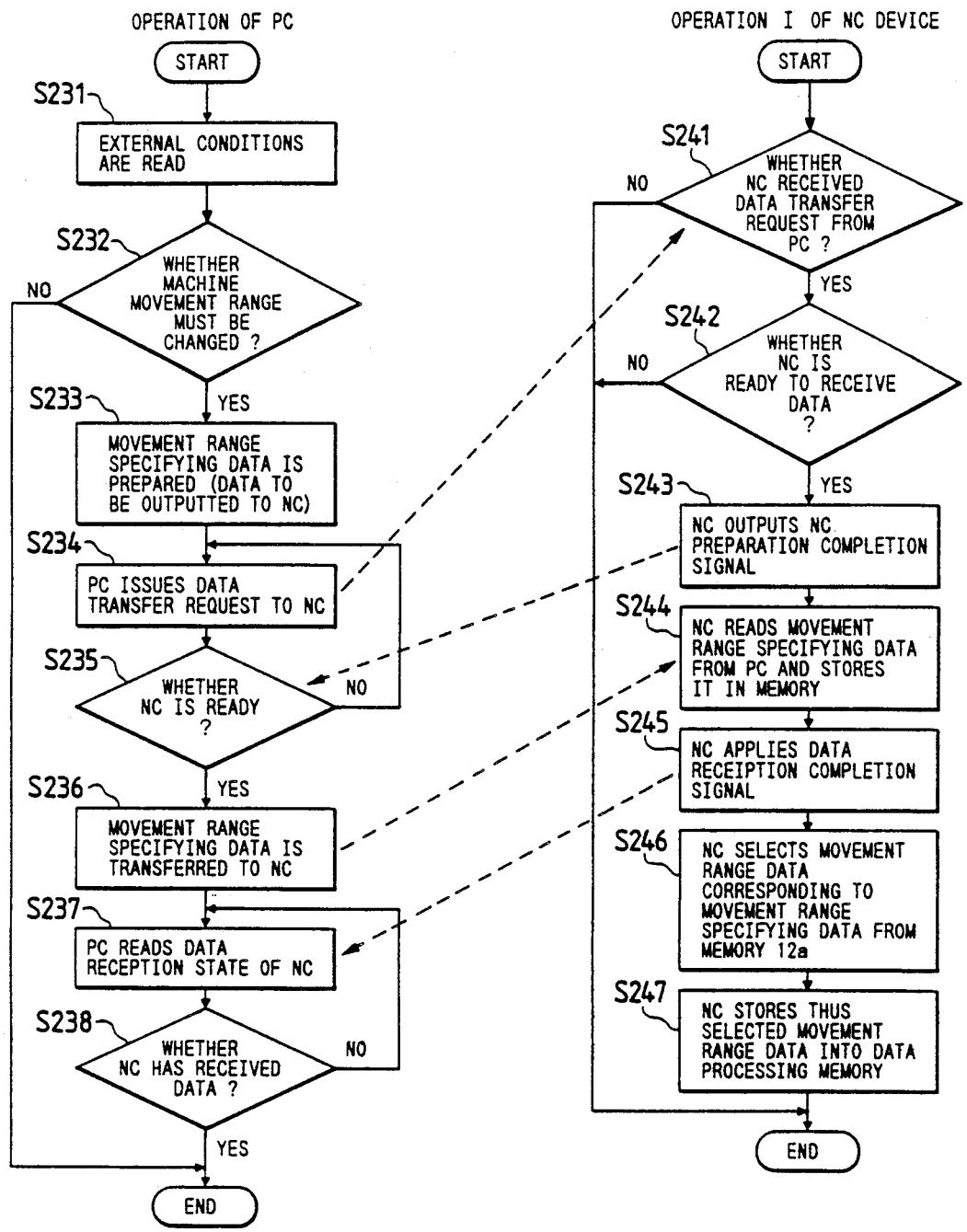
FIG. 15 is a flow chart for a description of the operation of the fifth embodiment of the invention.

FIG. 15 is a flow chart for a description of the operation of the fifth embodiment. The operation will be described with reference to the flow chart.

First, the operation of the PC 130 will be described. Similarly as in the case of the fourth embodiment, the PC reads external conditions in Step S231. In Step S232, it is determined from the kind of a workpiece to be handled whether or not the machine movement range must be changed. If "yes", then in Step S233, from the movement range specifying data which have been stored for the workpieces to be handled, the PC 130 selects one in correspondence to the workpiece, so as to be ready for transmitting it to the NC device 10. In Step S234, the PC 130 issues a data transfer request to the NC device 10. In Step S235, it is detected whether or not the NC device 10 is ready to receive the data. If "no", Step S234 is effected again. If "yes", then in Step S236, the PC transfers the movement range specifying data to the NC device 10. Thereafter, in Step S237, the PC 130 reads the data reception state of the NC device 10. And in Step S238, it is determined whether or not the NC device 10 has received the data. If "no", Step S237 is effected again. If "yes", the operation of the PC is ended. If, in Step S232, the result of determination is "no", then the operation is ended because it is unnecessary to change the movement range.

Now, the operation I of the NC device will be described.

In Step S241, it is determined whether or not the NC device has received the data transfer request from the PC 130. If "yes", in Step S242, it is detected whether or not the NC is ready to receive the data. If "yes", then in Step S243, the NC device outputs an NC device preparation completion signal. In Step S244, the NC device reads the movement range specifying data from the PC 130, and stores it in the buffer memory. In Step S245, the NC device applies a data reception completion signal to the PC 130. And in Step S246, in correspondence to the movement range specifying data, the NC device selects one from those stored in the memory 12d. In Step S247, the NC device stores the movement range data thus selected in a data processing memory. Thus, the operation I has been ended.

In FIG. 15, the broken line arrows indicate the transfer of data through the bus 35.

After the movement range data has been stored in the data processing memory, the movement range of the machine is limited in the same manner as in the fourth embodiment described with reference to FIG. 13, except that, instead of the movement range data, the data in the data processing memory is compared with the present position of the machine in Step S221 in the flow chart of FIG. 13.

Thus, the machine movement range is changed according to each of the different workpiece to be handled and to each of the different tools to be used, and the movement of the machine is controlled according to the machine movement range thus changed.

Now, a sixth embodiment of the invention will be described. The sixth embodiment is similar in arrangement to the fourth embodiment shown in FIG. 11, however, it is applicable to the case where, as described later, the PC sequence control is not carried out.

FIG. 16 is a flow chart for a description of the operation of the sixth embodiment. In the sixth embodiment, no data on movement ranges are transmitted between the PC 130 and the NC device 10.

First, the operation I will be described. The PC 130 detects the kind of a workpiece to be machined, and supplies a machining program selecting instruction to the NC device 10. In response to the signal, the NC device selects the corresponding machining program. And in response to a tool specifying signal, the tool is replaced with the aid of the PC 130. Thus, the machine starts machining the workpiece under the control of the NC device 10. When, during the machining operation, the corresponding machine movement range data is specified according to the machining program, then in Step S251, movement range data is inputted. In Step S252, the operating state of the machine is read. In Step S253, it is determined whether or not the movement range data can be changed. If "no", then Step S252 is effected again. If "yes", in Step S254, the movement range data specified according to the machining program is stored in the movement range data memory 12c. Thus, the operation I has been ended.

The movement range data is stored in the memory 12c similarly as in the case of the fourth embodiment.

Figure 13:
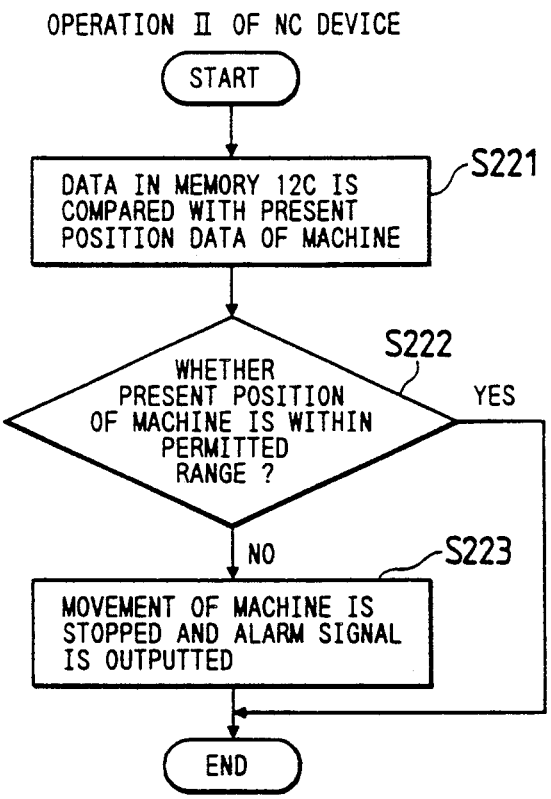
FIG. 13 is a flow chart for a description of the operation II of the NC device.

After the movement range data has been stored in the memory 12c, the operation II for limiting the machine movement range is the same as one carried out according to Steps S221 through S223 shown in FIG. 13.

In the sixth embodiment, unlike the fourth and fifth embodiments, the data on the movement range is not transmitted from the PC 130 to the NC device 10, and accordingly the PC sequence control is not carried out. Therefore, the sixth embodiment is also applicable to the case where the NC device 10 is combined only with the machine to be controlled thereby, for instance, to the machine where the tool is manually replaced, and the machining program is read each time.

The sixth embodiment may be so modified that, similarly as in the fifth embodiment, a plurality of movement range data have been stored in advance, and, according to the machining data, the predetermined movement range specifying data is inputted so as to select the movement range data corresponding to the movement range specifying data thus inputted.

In the fourth embodiment of the invention, as was described above, the machine movement range is changed according to the kind of a workpiece to be machined, that is, it can be set to a suitable value even in the case where a plurality of kinds of workpieces are handled on one line.

In the fifth embodiment of the invention, as was described above, instead of the movement range data, the movement range specifying data is transmitted from the PC to the NC device, and therefore the number of bits thereof may be small. Thus, the fifth embodiment has an effect that the interface may be small, in addition to the effect of the fourth embodiment.

In the sixth embodiment, as was described above, the movement range can be changed by the NC device only. That is, the sixth embodiment has not only the effect of the fourth embodiment but also an effect of easing the PC' burden.

What is claimed is:

1. A control device for an industrial machine comprising a numerical control device and a programmable controller, wherein said numerical control device comprises:

a data processing section essentially comprising a memory and a central processing unit, for analyzing and operating input numerical data, outputs of said data processing section being used for performing numerical control of a machine to be controlled and of rotation of a spindle head of said machine;

a gear ratio data memory for storing gear ratio data of gear means through which a spindle motor is coupled to said spindle head holding a tool, said gear ratio data being applied to said gear ratio data memory through a bus from said programmable controller adapted to perform sequence control of said machine; and synchronous operation control means for calculating actual speed of rotation of said tool in response to said gear ratio data and a feedback signal of said spindle motor, and performing synchronous operation control of said tool and a feed shaft.

2. A control device for an industrial machine comprising a numerical control device and a programmable controller, wherein said numerical control device comprises:

a data processing section essentially comprising memory and a central processing unit, for analyzing and operating input numerical data, outputs of said data processing section being used for performing numerical control of a machine to be controlled and of rotation of a spindle head of said machine;

a gear ratio data memory for storing gear ratio data of gear means through which a spindle motor is coupled to said spindle head holding a tool, and synchronous operation control means for reading when a tool number is specified according to a machining program, the corresponding gear ratio data from said gear ratio data memory, calculating actual speed of rotation of said tool in response to said gear ratio data thus read and a feedback signal of said spindle motor, and performing synchronous operation control of said spindle and a feed shaft.

3. A control device as claimed in claim 1, wherein said memory includes a machining program data memory for storing data of a machining program in execution when machining operation is suspended, and wherein said programmable controller includes suspending and restarting operation means for performing an operation to suspend said machine when an accident occurs during the machining operation and for performing an operation to restart the suspended operation on the basis of said data stored in said machining program data memory.

4. A control device as claimed in claim 1, wherein said memory includes movement range data memory for storing movement range data of said machine inputted through said bus from said programmable controller, said control device further comprising movement range limit means for allowing said machine to move only within the range corresponding to said movement range data stored in said movement range data memory, and stopping the movement of said machine and outputting an alarm signal when said machine enters into a movement inhibition range.

* * * * *